May 9, 1939.　　　F. A. DECKER　　　2,157,889
MECHANICAL TOY
Filed March 5, 1935　　　3 Sheets-Sheet 1
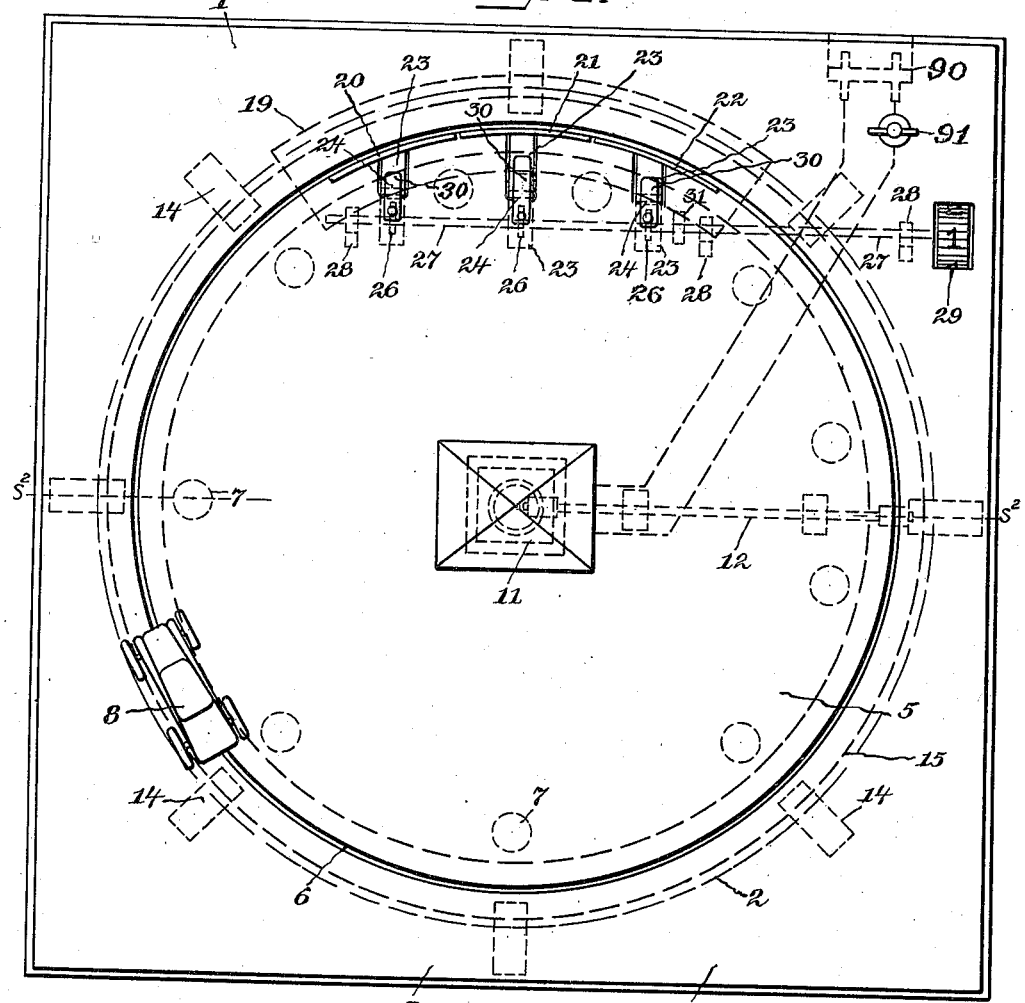

May 9, 1939.  F. A. DECKER  2,157,889
MECHANICAL TOY
Filed March 5, 1935  3 Sheets-Sheet 2
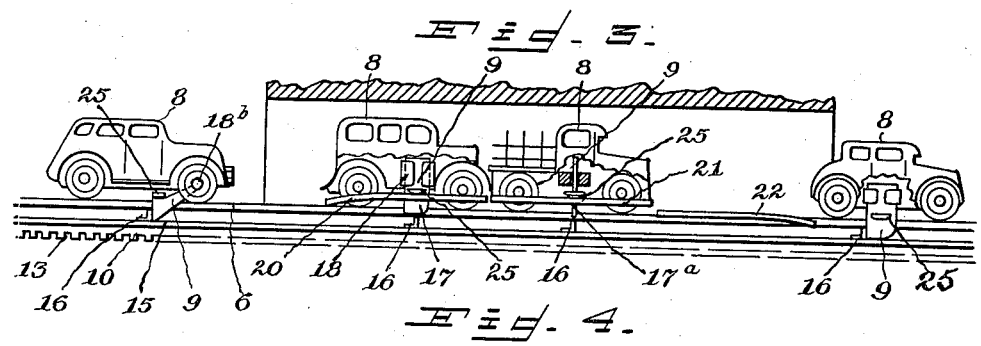
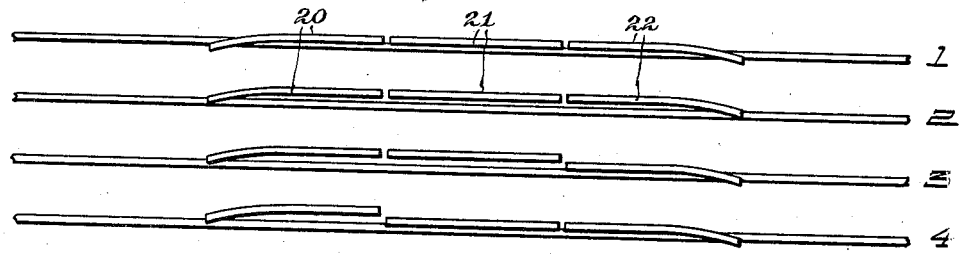
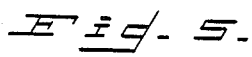
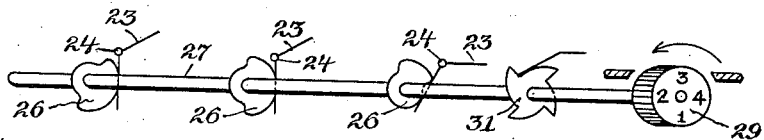
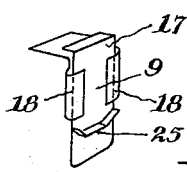
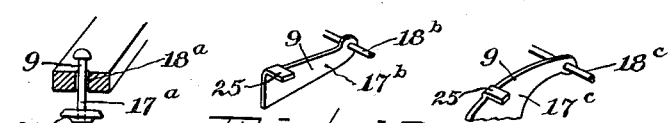
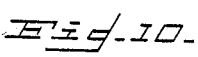
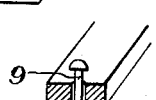
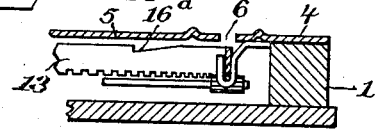
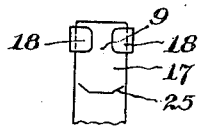
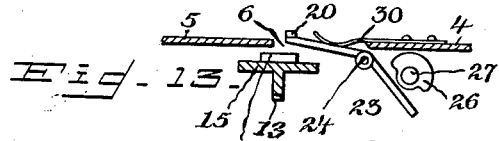
Inventor
Frank A. Decker
By his Attorney
Walter H. Humphrey May 9, 1939. F. A. DECKER 2,157,889
MECHANICAL TOY
Filed March 5, 1935 3 Sheets-Sheet 3
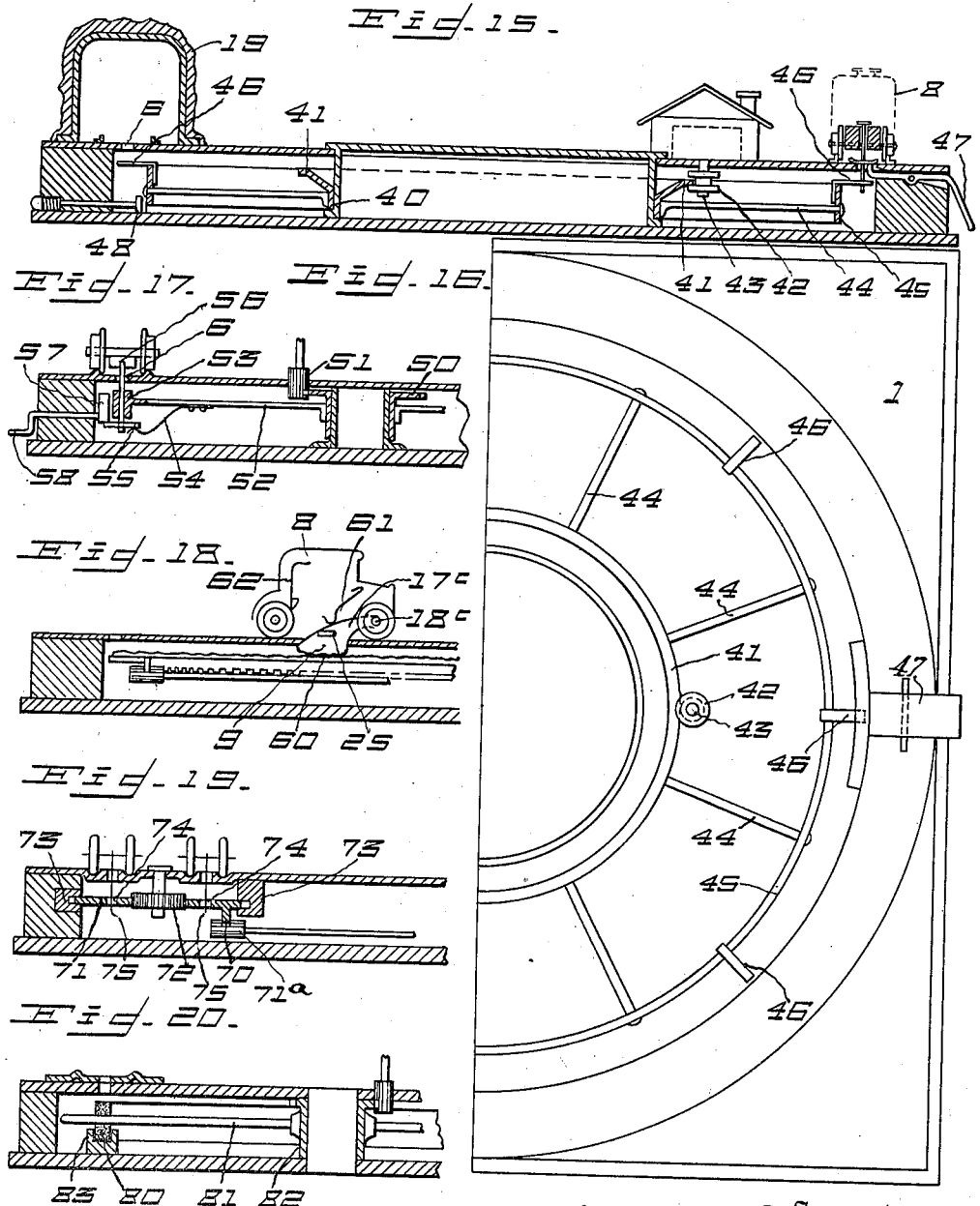

Patented May 9, 1939

2,157,889

UNITED STATES PATENT OFFICE 2,157,889

MECHANICAL TOY

Frank Albert Decker, New York, N. Y.

Application March 5, 1935, Serial No. 9,464

7 Claims. (Cl. 104—147)

This invention relates generally to mechanical toys and particularly to miniature road or track vehicle outfits of a form suitable for use by small children. More specifically, the invention comprises a self-contained portable unit consisting of a road bed with miniature vehicles movable over it and simple automatic means for effecting the performance and control of such vehicles. The toy is designed with a view to giving it sufficient strength and durability to successfully withstand the rough treatment to which it is ordinarily subjected in the hands of small children. While intended primarily as a plaything, the toy possesses educational qualities in enabling children, without knowledge of mechanics or the assistance of older people, to simulate natural large scale conditions and mechanical operation, which promotes thought, suggests ideas and proves generally instructive to young minds.

In present day toys in which the figure of a person or an animal or a vehicle or the like is caused to move around a circular, oval or other shaped track or roadway, a child's interest lasts only a short time, owing to the monotonous repetition of the same operation, with no provision for variation. To avoid this disadvantage, I have so designed my toy as to enable miniature automobiles or other vehicles employed in connection with it, to be interchangeably used, placed at will in close or separated relation and operated singly or in any number desired, so that innumerable combinations are possible, each giving a different effect and providing an extensive field for the exercise of the child's ingenuity in experimenting for variation.

In addition to the foregoing, a number of other important advantages of the invention will be pointed out in the detail description of the construction and operation given below.

In the accompanying drawings forming part of this specification, I have illustrated a preferred construction, together with various modifications thereof, suitable for carrying my invention into effect, but do not wish to be understood as limiting myself to the exact form or details shown, as the same may be varied more or less without departing from the spirit and scope of the invention as outlined in the appended claims.

In the drawings:

Fig. 1 is a plan view of a preferred form of the toy, constructed in accordance with my invention, certain parts being indicated in dotted lines for clearness of illustration.

Fig. 2 is a transverse section on the line $s^2$, $s^2$, of Fig. 1.

Fig. 3 is a sectional view along the line of the vehicle track through the tunnel, showing the manner in which movement is imparted to the vehicles by the driving member; also the disengagement from and re-engagement of the vehicles with the driving member as the vehicles enter and leave the tunnel. In this view the curvature of the track, which would throw the vehicles more or less in perspective, is disregarded and they are shown in elevation for clearness of illustration.

Fig. 4 shows four positions of a track device, preferably employed in the tunnel, by which the vehicles may be automatically disengaged from the driver and subsequently re-engaged for continued travel on the roadway.

Fig. 5 shows a hand-operated cam shaft for operating the track device shown in Fig. 4.

Fig. 6 is a detail perspective view of the preferred form of vehicle gravity shoe designed to be engaged by the driver to give movement to the vehicle over the roadway or track.

Fig. 7 shows a modified form of shoe.

Fig. 8 shows a second modification of the shoe.

Fig. 9, a third modification.

Fig. 10, a fourth modification.

Fig. 11, a fifth modification.

Fig. 12 shows a slightly modified form of driver.

Fig. 13 is a detail view of the device shown in Fig. 1, for disengaging the vehicles from the driver and Fig. 14 illustrates a slight modification thereof.

Fig. 15 is a sectional view illustrating a modified form of driver and vehicle disengaging device, and Fig. 16 is a partial plan view of the same.

Fig. 17 illustrates a second modification of driver.

Fig. 18 illustrates a third modification.

Fig. 19 shows a double track construction, and

Fig. 20, a fourth modification of the driver.

Before entering upon a detailed description of the construction and operation, it may be stated generally that the toy consists of a track or roadway, preferably circular, suitable for travel thereover of miniature vehicles, such as automobiles of passenger and commercial types, for example, which are given movement by a common motor-driven member, hereinafter referred to as the driving member. The driving member is located immediately below the road bed and is designed to engage a depending projection or shoe of each vehicle, which projects through a slot formed centrally of the roadway. The vehicles may be placed upon or removed from the track independently of each other and spaced thereon in any relation desired, that is, in close or separated formation. Provision is also made for causing the vehicles, when desired, to be automatically disengaged from the driving member, as the vehicles enter a tunnel or covered section of the roadway, and thereafter automatically moved out of the tunnel, one at a time, into re-engagement with the driving member for continued travel around the track. This last mentioned feature serves to break the monotony of uninterrupted travel of the vehicles around the roadway and gives added interest to the operation by causing the vehicles to disappear and reappear mysteriously without manipulation by the operator of the toy.

Referring now to the drawings, 1 represents a base board, which may be square, rectangular, circular or of any other shape in outline desired. A circular recess 2 is formed to a suitable depth in the upper surface of the board and extends throughout the greater portion of the area thereof.

Covering the entire upper surface of the board, including the recessed portion, there is a metal plate 3. This plate is divided into two sections 4 and 5, by a circular slot 6 which is concentric with the circular recess in the base board but of slightly smaller diameter. The outer section 4 of the plate 3 is secured by screws or in any other suitable manner fast to the base board. A series of suitably spaced posts 7, 7 extend upward from the bottom of the recess in the base board and serve as supports for the inner circular section 5 of the metal plate 3, which inner section is secured to the posts.

The slot 6, provided between the inner and outer sections of the plate 3, is located at the center of the roadway on which miniature wheeled vehicles 8 of the toy are designed to run and serves to give entrance to a depending projection or shoe 9 from each vehicle, which passes through the slot and into engaging relation with a driving member 10, located immediately below the slot.

The vehicles are provided with rotatable wheels to reduce friction and the load on the motor and also to give a more realistic effect in travel as the toy is operated.

It will also be noted that the vehicles are independent of each other, that is to say, they may be separately placed in position for travel on the roadway, separately removed therefrom, placed in close or separated formation and employed in unlimited number, within the capacity of the roadway.

The driving member comprises an electric or spring motor 11, mounted centrally of the inner circular section 5 of the plate 3, and geared through a radially-disposed pinion shaft 12 to drive a large ring gear 13.

The ring gear 13 is rotatably mounted in suitable bearings 14, 14 and is flanged to provide a flat rim 15 immediately under the slot 6. Formed on the upper surface of this rim 15, at equispaced intervals, there are suitably shaped lugs or projections 16, designed to engage the depending shoes of the vehicles projecting through the slot 6 to give motion to the vehicles along the roadway.

The depending shoes of the vehicles may take various forms. Preferably I employ the form shown in Fig. 6, which consists of a gravity drop slide 17, freely movable in bearings 18, 18 secured in fixed relation centrally of the vehicle, so that when the drop slide or shoe enters the slot 6, the vehicle will be centered on the roadway, as shown in Figs. 1 and 2.

In Figs. 7 to 11 inclusive, I have shown modifications of the shoe. In Fig. 7, the shoe is in the form of a weighted pin 17$^a$, freely movable in a bearing 18$^a$, secured to the body of the vehicle. In Fig. 8, the shoe is represented as a plate 17$^b$, loosely pivoted at one end on the forward axle 18$^b$ of the vehicle, as shown at the left in Fig. 3. In Fig. 9, a different form of plate 17$^c$ is shown, loosely pivoted to the vehicle axle 18$^c$. This last mentioned form is designed to cooperate with a modified form of driving member to be hereinafter described.

In Fig. 10, the shoe is of the same general form as that shown in Fig. 6, but like the Fig. 9 form, is designed to be used in connection with a modified form of driving member to be hereinafter described. In Fig. 11, the shoe is of the Fig. 7 form, but a spring is provided to assist the gravity drop action of the shoe. Several of the above described shoe constructions are applied to the vehicles shown in Fig. 3.

From the foregoing it will be evident that the construction of the vehicle shoe may be greatly varied in providing the required connection between the vehicle and the driving member.

Extending over a section of the roadway of a length sufficient to house a number of the vehicles, preferably three, I provide a covering in the form of a tunnel 19. (See the dotted line indication in Fig. 1 and the full line showing in Figs. 2 and 3). Within the tunnel a vehicle shoe-disengaging device is located and consists of three rail sections 20, 21 and 22, arranged end to end along the inner side of the slot 6. (See Figs. 1 and 13). As shown in Fig. 3, each rail section is of sufficient length to accommodate a vehicle and each is secured at right angles, fast to the end of a lever 23, pivoted at 24, the arrangement being such that movement of any one of the levers about its pivot, raises its rail section above the level of the roadway into position to engage a lug or projection 25, provided on each of the vehicle shoes, and move the shoe upward out of engagement with the driving member. This serves to bring the vehicle to a stop, as shown in Fig. 3, where two vehicles in the tunnel have been thus disengaged from the driving member.

As shown in Fig. 4, the outer end of each end rail section is curved downwardly to ease engagement and disengagement with the lug or projection of the vehicle shoes, as the vehicles enter and leave the tunnel.

The levers 23, carrying the rail sections, (see Figs. 5 and 13), are given movement by cams 26, fast on a shaft 27 mounted in suitable bearings 28. The shaft is manually rotated by means of a terminal knob 29. Each lever 23, is acted upon by a spring 30 which tends to force the track section, carried by the lever, downward to the level of the roadway and in so doing, maintains the free end of the lever in contact with its particular cam.

The cam shaft turning knob 29 has equispaced markings 1—2—3—4 on its peripheral face as shown in Fig. 1, to indicate the different positions of the rail sections shown in Fig. 4. The numbering (1—2—3—4) is shown on the flat face of the knob in Fig. 5, for convenience of illustration.

A spring dog ratchet 31 on the cam shaft, (see Fig. 5), yieldingly holds the latter in any position to which it is turned.

Referring to Fig. 4, the position numbered 1, shows the rail sections all at the level of the roadway and thus positioned, the vehicles will pass through the tunnel without being disengaged from the driving member. In position numbered 2, all the rail sections are raised and the first vehicle to enter the tunnel will come to a stop on the first rail section. The next vehicle to enter the tunnel will push the first vehicle forward on to the second rail section and take its place on the first rail section. A third vehicle entering the tunnel will push the two therein forward one section each and come to a stop on the first rail section. At this point we would have the tunnel filled to capacity and as the entrance of another vehicle operates to push the three vehicles in the tunnel forward one rail section, the vehicle nearest the exit end is moved out of the tunnel and as its shoe clears the last rail section, the shoe drops by gravity and is caught by the driving member, moving the vehicle forward along the roadway. This last described operation will then be repeated as each vehicle on the roadway enters the tunnel.

If we turn the knob to the position numbered 3, in Fig. 4, we would get the last above described operation with only two vehicles in the tunnel, as shown in Fig. 3, as the rail section nearest the exit end of the tunnel is lowered while the other two are raised and, in consequence, the vehicle moved to the third lowered rail section is immediately caught by the driving member and carried forward along the roadway. The cam shaft adjustment shown in Fig. 5, corresponds to the No. 3 position of the rail sections in Fig. 4.

In turning the knob to the position numbered 4, in Fig. 4, the above operation would be repeated with only one vehicle in the tunnel, as will be evident from the position of the rail sections.

This arrangement by which one type or color of vehicle entering the tunnel, causes another type or color of vehicle to move out of it, excites the interest of a child and as the vehicles may be removed, replaced, rearranged and respaced at will, the average child will naturally try out different combinations and so continue amused, as each new combination produces a different effect.

In Fig. 14, a slight modification of the track rail section support of the vehicle disengaging device is shown. In Fig. 13, it apears as a pivoted lever acted upon by a spring, and in the modification the functions of these members (lever and spring) are performed by a spring arm 23—30, which supports the rail section and is given movement by a cam 26, as in Fig. 13.

In Fig. 12, a slight modification of the driving member is shown. In Fig. 3, for example, spaced lugs or projections on the rim of the ring gear engage the vehicle shoes to give the vehicles motion on the roadway. In the modification, notches 16ª are substituted for the lugs or projections, otherwise the construction and operation is substantially the same as above described.

In Figs. 15 and 16, I have shown a modification of the ring gear positive drive, illustrated in Figs. 1, 2 and 3, which consists in substituting for it a friction driven wheel. The wheel turns on a center bearing, indicated at 40 and is provided with a flange 41, which cooperates with a grooved friction pulley 42 on the shaft of a motor 43. Extending outward from the flanged hub of the wheel, equispaced spokes 44 are provided, which support the rim 45, and from the rim there are radial projections 46, designed and positioned to engage the vehicle shoes entering through the slot of the roadway.

In this modification, I have shown the vehicle disengaging device located outside of the tunnel and the rail section supporting levers arranged to be operated directly by hand, as indicated at 47. The operation and manipulation of the vehicles is otherwise the same as above described. I have also shown in this modification a spring-retracted friction brake 48 which is designed to act on the rim of the wheel to vary the speed thereof as desired.

In the construction shown in Fig. 17, a spoked wheel is again employed but is positively driven by a gear 50 and pinion 51. In this form the wheel spokes 52 terminate in bearings for pins 53, which extend upwardly through the roadway slot 6, and are thus yieldingly maintained by springs 54, acting against disk heads 55 of the pins. In this case, the pins 53, projecting through the roadway slot, engage suitable projections 56 on the vehicles and may be disengaged therefrom by means of cams 57, rotated by hand-operated crank shafts 58 acting on the terminal disk heads 55 of the pins 53.

In Fig. 18, I have shown the rim of the driving member and the vehicle shoe roughened, as indicated at 60, for frictional engagement. In this case, the vehicle shoe is pressed downwardly by a spring 61, to insure good frictional contact with the driving member. There is also shown a spring catch 62, carried by the vehicle for engaging and holding the shoe in retracted position when not in use.

In Fig. 19, I have shown a double roadway arrangement by means of which two lines of vehicles are moved in opposite directions. In this case two ring gears 70, 71 are employed. The gear 70 is given motion by a motor-driven pinion 71ª and through a second pinion 72, motion is transmitted from the gear 70 to the gear 71, so that the two gears move in opposite directions. Suitable bearings 73, 73 are provided for the gears and in the flanged rims thereof openings or slots 74 are provided to receive in driving relation the pin-shaped shoes 75 of the vehicles.

In Fig. 20, I have shown the vehicle driving member in the form of a flexible belt 80, which is carried by spokes 81 extending radially outward from the hub 82, and is further supported by a grooved guide 83. By having the wheel spokes of sufficient length and passing loosely through openings in the belt, the latter will adapt itself to any form or shape of roadway, assisted by a properly shaped grooved guideway. Vehicle drive from the belt can be effected by spaced metal clips attached to the belt or by friction, whichever is preferred.

When an electric motor is employed as the source of power, it may be wired as indicated in Fig. 1, to provide a socket 90 in the base board to receive a terminal plug (not shown) of a wired connection from an ordinary house lighting or other circuit. A hand-operated control switch is shown on the base board at 91, to enable the circuit to be closed or opened as desired without removing the plug from the socket.

As the operation and many important advantages of the invention will be apparent from the foregoing, it will not be necessary to further describe the same.

Having described my invention, I claim:

1. In a mechanical toy, a chambered base, an endless slot formed in the upper surface of the base, a rim-supported driving member mounted in the base chamber in line with the slot, vehicles movable independent of each other on the roadway formed by the upper surface of the base, and a self-engaging device on each vehicle for connecting the vehicle through the slot with the driving member when the vehicle is placed in position on the roadway, the said device being self-disengaging from the driving member as the vehicle is removed from any point in the roadway.

2. In a mechanical toy, a base, a cover supported above the base and formed in two sections spaced apart to provide an intervening endless slot, a rim-supported driving member mounted under the cover in line with the slot, vehicles movable independent of each other on the roadway formed by the cover, and a self-engaging device on each vehicle for connecting the vehicle through the slot with the driving member when the vehicle is placed in position on the roadway, the said device being self-retracting to permit unobstructed travel of the vehicle on an unslotted surface.

3. In a mechanical toy, a base, a cover for the base comprising an inner disk-like section and an outer surrounding section, the two sections being separated and spaced apart to provide an intervening slot, the said inner section being supported from the under side to free its upper surface of obstruction, a motor-driven ring of substantially the diameter of the inner circular section of the cover mounted beneath the same and a plurality of wheeled vehicles independently movable on the upper outer surface of the slotted cover as a roadway and detachably connected to the motor driven ring.

4. In a mechanical toy, a chambered base, a plurality of endless slots formed in the upper surface of the base, a rim-supported driving member mounted in the base chamber in line with each slot, gearing connecting the driving members, vehicles movable independent of each other on the roadway formed by the upper surface of the base, and a self-engaging device on each vehicle for connecting the vehicles through the slot with the driving members when the vehicles are placed in position on the roadway, the said device being self-disengaging from a driving member when a vehicle is removed from any point in the roadway.

5. In a mechanical toy, a chambered base, a curved slotted roadway formed on the upper surface of the base, a rim supported driving member mounted in the base chamber in line with the slotted roadway, vehicles movable independently of each other on the roadway, a self-engaging device on each vehicle for connecting the vehicle through the slot with the driving member when the vehicle is placed in position on the roadway, the said device being self-disengaging from the driving member as the vehicle is removed from the roadway, a covered section on part of the roadway and means mounted on the base for operating mechanism under the covered section for selectively disengaging one or more vehicles from and re-engaging them with the driving member when the vehicles are in the covered section of the roadway for the purpose described.

6. In a mechanical toy, the combination of a portable chambered base, a curved slotted roadway formed on the upper surface of the base, a rim supported driving member mounted in the base chamber in line with the slotted roadway, one or more wheeled vehicles connected through the slot in the roadway to the driving member and adapted to follow the path of the roadway, a housed motor on the base, connecting means from the motor to operate the driving member, said means comprising a covered horizontally disposed shaft extending from the motor and having driving means on the end thereof to engage the driving member.

7. A mechanical toy of the class described, comprising a portable base, a curved slotted roadway formed on the base, a rim-supported driving member mounted under the slotted roadway, a motor to operate the driving member, toy vehicles movable independently of each other on the roadway and separately removable therefrom, a self-engaging device on each vehicle for connecting the vehicle through the slot with the driving member when the vehicle is placed in position on the roadway, the said device being self-disengaging from the driving member as the vehicle is removed from the roadway, and mechanism located at a fixed point in the path of the vehicle on the roadway, the said mechanism being operable by remote control for selectively disengaging one or more vehicles from and re-engaging them with the driving member for the purpose described.

FRANK ALBERT DECKER.